United States Patent [19]

Clinch

[11] 3,927,949
[45] Dec. 23, 1975

[54] PLASTIC HINGES
[75] Inventor: Colin W. F. Clinch, Woodley, England
[73] Assignee: ITW Limited, Slough, England
[22] Filed: Sept. 18, 1974
[21] Appl. No.: 507,027

[30] Foreign Application Priority Data
Sept. 17, 1973 United Kingdom............. 43500/73

[52] U.S. Cl. .............. 402/22; 16/DIG. 13; 402/26; 402/70; 402/80 R
[51] Int. Cl.² ......................................... B42F 3/02
[58] Field of Search ............ 402/8, 19, 20, 21, 22, 402/23, 70, 80 R, 26; 16/DIG. 13, 142; 24/16 R, 16 PB

[56] References Cited
UNITED STATES PATENTS

| 1,046,181 | 12/1912 | Hale ..................................... 402/21 |
| 1,269,764 | 6/1918 | Weaver ............................... 16/142 |
| 1,344,971 | 6/1920 | Allison ............................... 402/80 R |
| 3,251,364 | 5/1966 | Goldman .......................... 402/22 |
| 3,313,303 | 4/1962 | Beyer ................................... 402/22 |
| 3,313,304 | 4/1962 | Beyer ................................... 402/22 |
| 3,842,463 | 10/1974 | Wehner ............................. 16/142 |
| 3,854,650 | 12/1974 | Hanaue ............................. 16/DIG. 13 |

FOREIGN PATENTS OR APPLICATIONS

| 1,188,173 | 3/1959 | France ............................. 24/16 PB |
| 656,635 | 10/1963 | Italy ..................................... 402/8 |
| 376,884 | 7/1932 | United Kingdom .............. 402/70 |
| 428,819 | 5/1935 | United Kingdom .............. 16/14 L |
| 59,846 | 5/1958 | India ................................. 402/19 |

Primary Examiner—Jerome Schnall
Attorney, Agent, or Firm—J. R. Halvorsen; R. W. Beart

[57] ABSTRACT

An integral moulding of a resilient plastics material comprising a first portion and a second portion hinged together by a web of small width and thickness; the first portion having a recess facing towards the web, and a lip bounding the recess at one side and directed towards the web; and the second portion having a rib directed away from the web; the relative distances of the lip and rib from the web being such that relative rotation of the first and second portions in one direction will cause the rib and lip to engage each other and continuation of the rotation in that direction will cause the rib and lip to ride past each other until the rib lies in the recess.

2 Claims, 5 Drawing Figures

PLASTIC HINGES

According to this invention an integral moulding of a resilient plastics material comprises a first portion and a second portion hinged together by a web of small width and thickness; the first portion having a recess facing towards the web, and a lip bounding the recess at one side and directed towards the web; and the second portion having a rib directed away from the web; the relative distances of the lip and rib from the web being such that relative rotation of the first and second portions in one direction will cause the rib and lip to engage each other and continuation of the rotation in that direction will cause the rib and lip to ride past each other until the rib lies in the recess.

One example of a moulding embodying this invention is described below with reference to the accompanying drawing. This moulding is a module of a loose-leaf arch fitting.

Figure 2:
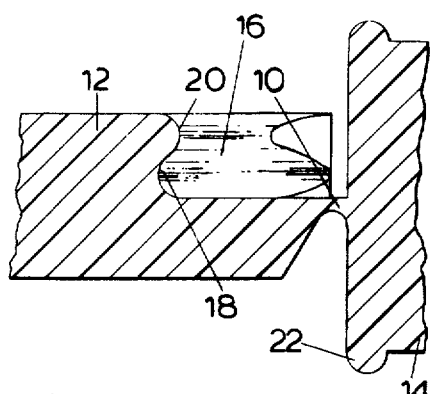
FIG. 2 is a section through the middle of FIG. 1, on the line II—II in FIG. 4.
Figure 3:
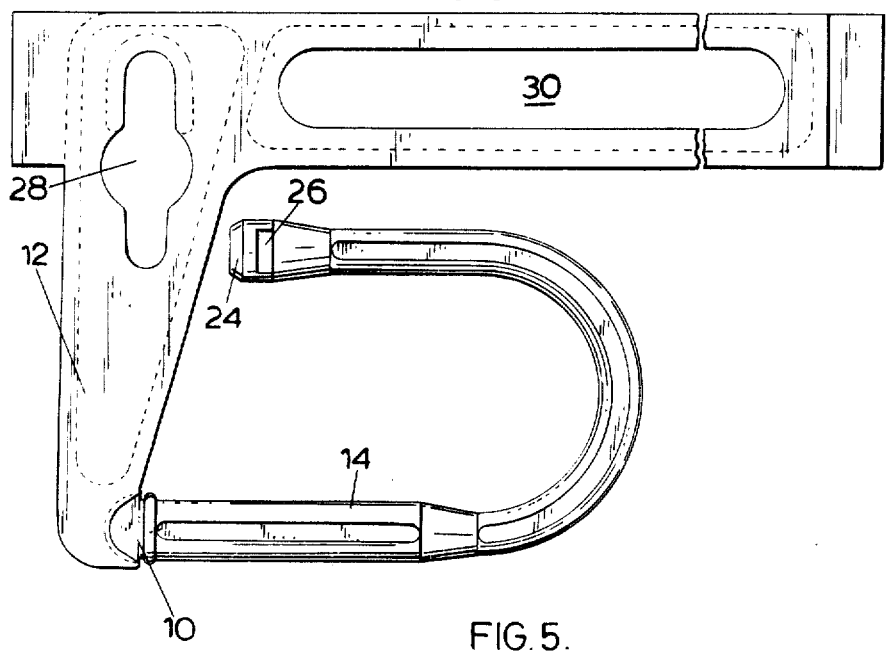
FIG. 3 is a plan of the whole moulding.

A web 10, integral with the rest of the plastics moulding, constitutes a hinge. The web is of small width and thickness, that is to say its dimensions horizontally and vertically in FIG. 2 are both small. The web hinges together adjacent portions of the moulding, namely a first portion 12, which is a bracket of the loose-leaf arch fitting, and a second portion 14 which is part of the arch itself.

Figure 1:
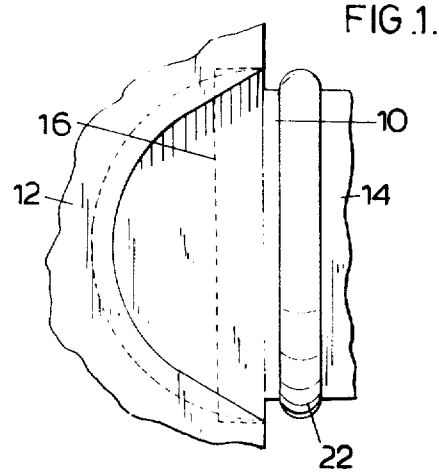
FIG. 1 is a fragmentary plan of the web and the adjacent portions.

The first portion 12 has a recess 16, the form of which is seen in detail in FIGS. 1 and 2. In plan (FIG. 1) it is substantially parabolic, and in section (FIG. 2) it is seen to have a smooth undercut 18 defined beneath a lip 20. The undercut is indicated in broken line in FIG. 1.

The second portion 14 is substantially a long solid, right circular cylinder having a rib 22 in the form of a peripheral bead, around one end.

The crest of the rib 20, considered in a plane containing the web 10 and the rib 20 (i.e. substantially as seen in FIG. 1) is concave towards the web, and is in fact substantially parabolic.

The crest of the rib 22 likewise, considered in a plane containing the web and the lip, is concave towards the web 10, and is in fact similar to the crest of the rib 20, and thus parabolic.

Figure 4:
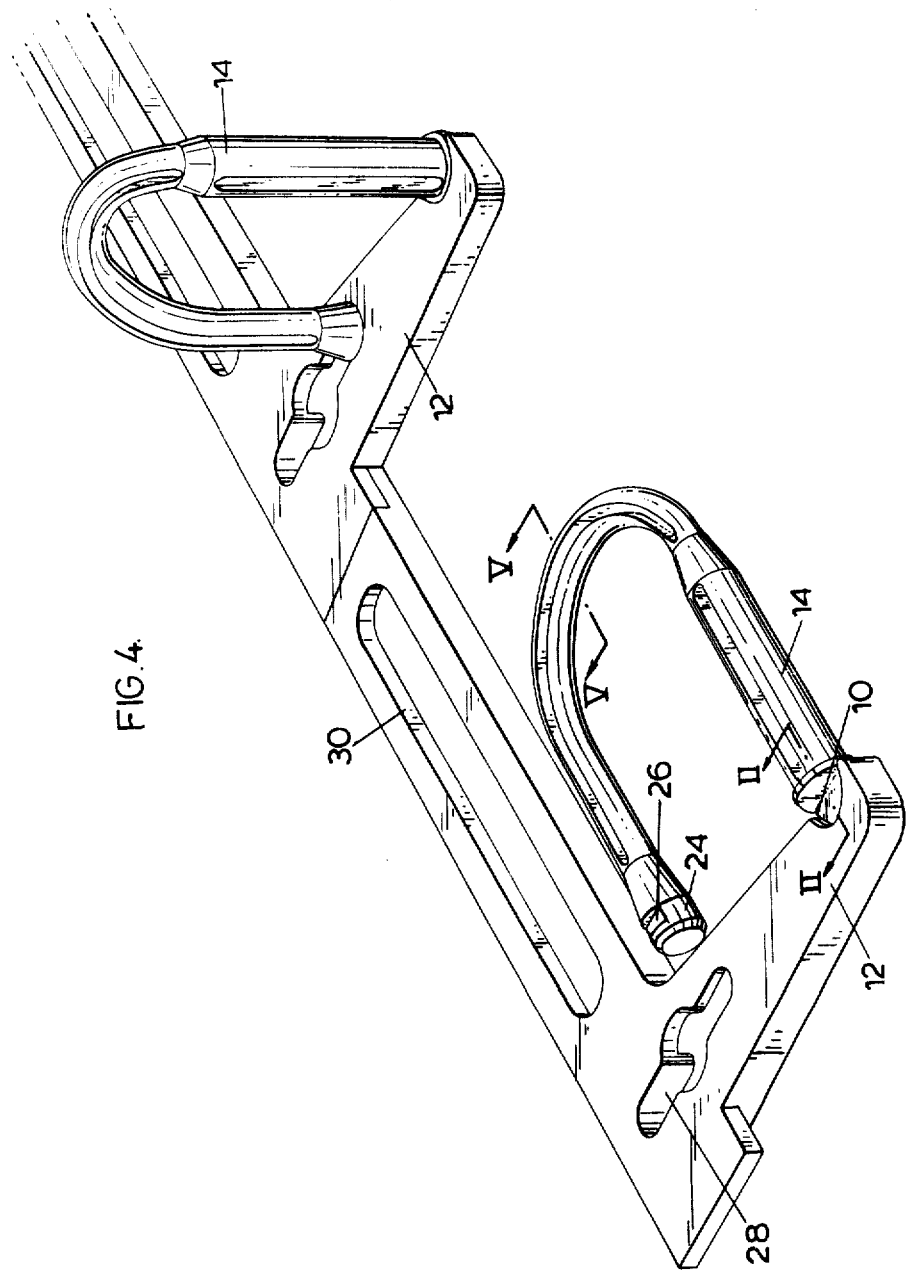
FIG. 4 is a perspective view of two adjacent modules of the arch fitting, one of which has been moved to its final position.

The presence of the hinge enables the moulding to be made in a two-plate mould, the portions of the moulding being initially disposed as shown in the left part of FIG. 4. In order to attain the disposition for use, as shown in the right part of FIG. 4, the second portion 14 can be rotated through 90° anticlockwise about the hinge 10 relatively to the first portion 12, and the rib 22 will first engage the outer portions of the parabolic lip 20 and will proceed to move downwards past that lip, the two points of contact between the rib and the lip moving towards the centre of the parabola, whereupon the rib will ultimately ride past the lip, and become gripped in the smooth undercut 18, thereby to hold the two portions in that perpendicular position shown in the right part of FIG. 4.

The proportions of the rib 22 and the undercut 18 are such that, when the rib is in the recess, it makes a close fit in the recess.

The first portion 12 is bounded by a flat face, which extends from the web 10 to the undercut 18, and forms the bottom of the recess 16 as seen in FIG. 2. The second portion 14 is bounded (on its left in FIGS. 1 and 2) by a flat face which extends from the web 20 to the rib 22. These two flat faces abut one another when the rib 22 is in the undercut 18; so that there is no play between the portions 12 and 14.

Figure 5:
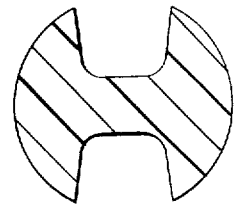
FIG. 5 is an enlarged section on the line V—V in FIG. 4.

The remote free end 24 of each arch is slotted on both sides, as seen at 26, and can thereby be releasably fastened into keyhole slots 28 in the spine or base of the module. The spine or base also has slots 30 by means of which the module can be fitted to either stiff covers or to a wall. The cross sectional shape of the arch, shown in FIG. 5, makes for flexibility of the arch in the required direction, and economy of material.

The moulding can be of any flexible plastics material.

I claim:

1. A loose-leaf binder formed from a one-piece plastic molding including a base portion, at least one bracket arm extending outwardly substantially perpendicular from and being coplanar with said base portion and including an aperture with a restricted throat positioned at the juncture of said base portion and said bracket arm, resilient integral arch means extending upwardly from said at least one bracket arm adjacent its free extremity removed from said base portion, said arch means being deformable and at least initially having a generally U-shaped configuration with one end of the arch means permanently affixed to said bracket arm at said free extremity by a web forming a resilient hinge means, said bracket arm adjacent an edge thereof having a recess facing toward the web, and a lip bounding the recess at one side and directed towards the web, and said one end of said arch means including a rigid portion having a rib directed away from the web, the relative distances of the lip and rib from the web being such that relative rotation of said arch means and said bracket arm in one direction pivoted about said web will cause the rib and lip to engage each other and continuation of the rotation in that direction will cause the rib and lip to ride past each other until the rib lies in the recess and below said lip in retained relationship, said arch means formed having cooperative means at its opposite extremity for telescopic introduction into said aperture and adapted to cooperate with said restricted throat for releasable fixment therewith, said aperture throat being in the form of a keyhole slot and said cooperative means at the free end of the arch means being slotted and adapted to have said slotted end moved into the restricted throat of the keyhole slot, said arch means being initially molded in a flat position generally parallel to said base portion and co-planar with the base portion and said bracket arm and is adapted to be rotatably moved into a position by said hinge means perpendicular to a plane passing through said base portion and bracket arm and locked in place by said rib and lip located on the bracket arm and the arch means at adjacent ends thereof.

2. A device of the type claimed in claim 1 wherein said cooperating protuberance and groove means are of complimentary parabolic configurations.

* * * * *